March 31, 1925.　　　　　　　E. D. PARKER　　　　　1,531,496
LAWN SWEEPER
Filed Feb. 26, 1923　　　2 Sheets-Sheet 1
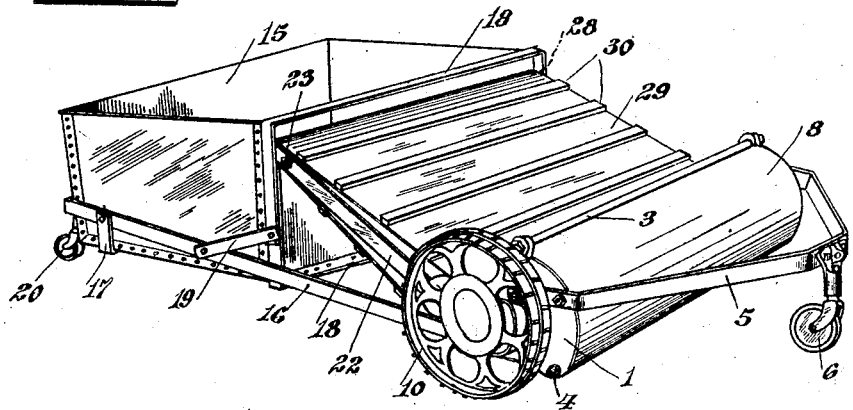
Fig. 1.
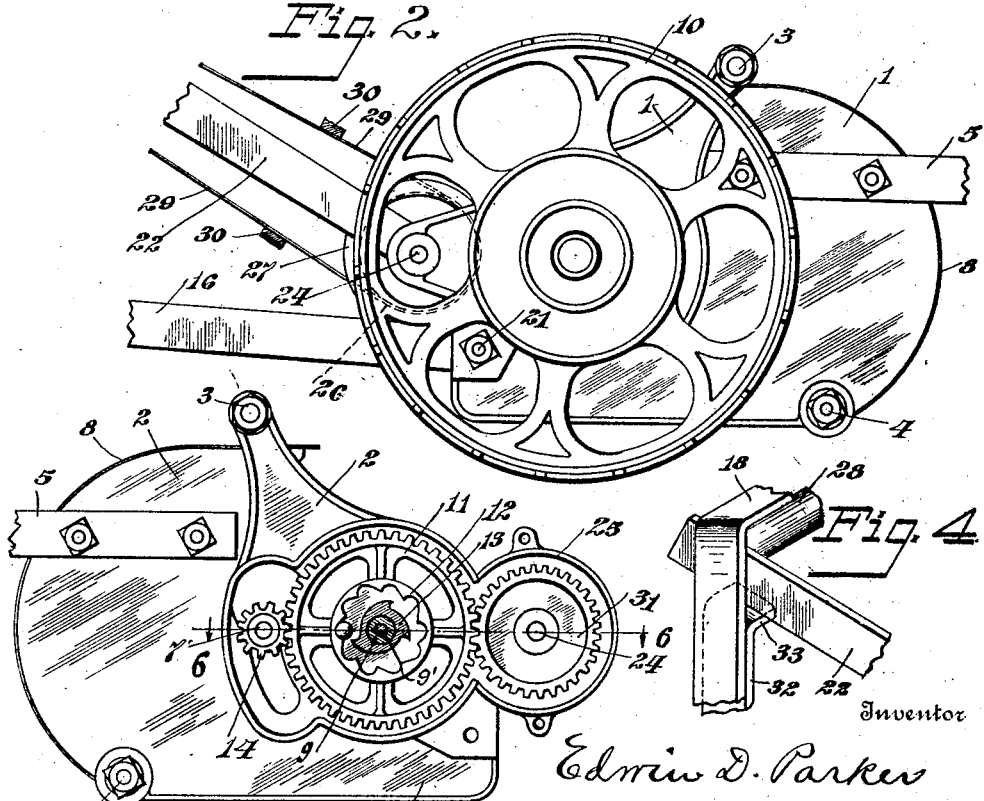
Fig. 2.
Fig. 3.　　Fig. 4.
Inventor
Edwin D. Parker
By Staley & Bowman
Attorneys March 31, 1925.

E. D. PARKER

LAWN SWEEPER

Filed Feb. 26, 1923

Inventor
Edwin D. Parker
By Staley W. Berman
Attorneys

Patented Mar. 31, 1925.

1,531,496

UNITED STATES PATENT OFFICE.

EDWIN D. PARKER, OF SPRINGFIELD, OHIO, ASSIGNOR TO THE PARKER PATTERN WORKS COMPANY, OF SPRINGFIELD, OHIO, A CORPORATION OF OHIO.

LAWN SWEEPER.

Application filed February 26, 1923. Serial No. 621,208.

*To all whom it may concern:*

Be it known that I, EDWIN D. PARKER, a citizen of the United States, residing at Springfield, in the county of Clark and State of Ohio, have invented certain new and useful Improvements in Lawn Sweepers, of which the following is a specification.

This invention relates to improvements in sweepers, it more particularly relating to lawn sweepers which comprise a rotary sweeping element, an endless conveyor for carrying the sweepings from the sweeping element, and a box or receptacle for receiving the sweepings from the conveyor.

An object of the invention is to provide an arrangement in which the parts are so disposed and connected with each other as to lend the necessary flexibility to the structure to enable it to adjust itself to uneven travel.

A further object of the invention is to devise an implement of this character which will be simple in its construction, effective in operation and economical in manufacture.

Referring to the drawings:

Fig. 1 is a perspective view of an implement embodying the improvements.

Fig. 2 is a side elevation of a portion of the same.

Fig. 3 is a view of the opposite side of a portion of the implement from that shown in Fig. 2 with one of the carrying wheels and the gear casing removed, a portion of the clutch mechanism being shown in section.

Fig. 4 is a detail perspective view of one of the rear supports for the conveyor frame.

Figure 5:
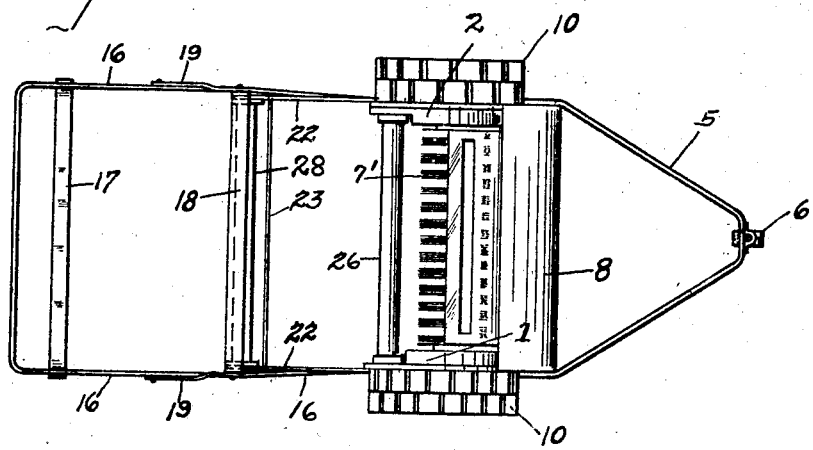
Fig. 5 is a top plan view with the receptacle and endless apron removed.
Figure 6:
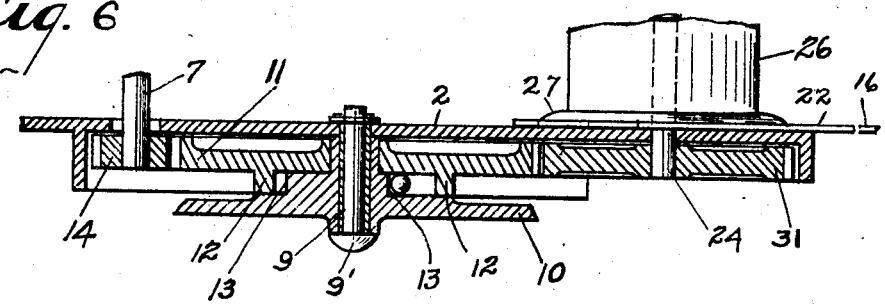
Fig. 6 is a section on the line 6—6 of Fig. 3 but showing in addition in plan view a portion of the lower apron roller and portions of the frames for the endless apron and receptacle.

In the drawings, 1 and 2 represent a pair of castings which form the sides of the main frame which are connected together by cross-rods 3 and 4 and also by a forwardly extending yoke member 5, to the central portion of which is swivelled a caster wheel 6 which acts as a gauge wheel. A sweeping element of well known form, the shaft 7 only of which is shown in the present case, has its shaft journaled in bearings carried by the side supporting members 1 and 2 and the forward side of this sweeping element is enclosed by a sheet metal casing 8 suitably secured to said supports. Each side support has a laterally projecting hollow spindle 9 secured thereto by the bolt 9' upon which spindles are journaled the extended hubs of the carrying wheels 10. Upon the extended hub of each of the carrying wheels is journaled a gear 11 having formed integrally therewith one member 12 of a one-way ball clutch, the other member 13 of which is integrally formed with the hub of the carrying wheel whereby motion will be imparted to the gear 11 upon the forward travel of the machine in a well known way. Each end of the shaft 7 of the rotary sweeping element 7' has a pinion 14 meshing with the corresponding gear 11 so that upon the forward travel of the machine rotary motion will be imparted to the sweeper.

A removable receptacle 15 preferably of sheet metal is carried by a frame consisting of a U-shaped bar, the side members of which are represented by 16 and which are connected together near the rear ends by a cross-bar 17 having its ends upturned as shown and connected with the side members 16, and also by a rectangular shaped frame 18 having the lower ends of its side portions directly connected with the members 16 and also connected therewith by braces 19.

The rear end of this frame is mounted upon a pair of caster wheels arranged at opposite sides thereof, one only of which is shown at 20. The forward end of each of the side frame members 16 of this frame is pivotally connected with the respective main frame members 1 and 2 by bolts 21 or other suitable fastening means at points to the rear of the main carrying wheels.

The conveyor frame consists of a pair of side bars 22 connected together near their upper ends by a cross-rod 23 and having their lower ends perforated and journaled upon a shaft 24 which is journaled in rear extensions 25 integrally formed with the respective side frame members. This shaft has connected therewith a roll shown in dotted lines at 26 in Fig. 2, each end of which is provided with a rim 27 and about this roll and a second roll 28 carried by the upper ends of the side bars 22 passes an endless apron 29 preferably provided with transverse cleats 30. One end of the shaft 24 has secured thereto a gear 31 which meshes with the gear 11 whereby rotary motion is imparted to the roll 26 to impart travel to the apron.

The upper ends of the side bars 22 are slidably supported from the rectangular frame 18, the side members of this frame being provided with strips 32 having their upper ends bent inwardly as indicated at 33 to form shelves upon which the bars 22 rest.

From this construction it will be seen that an extremely flexible structure is provided which will permit either the main frame or the receptacle frame to rise and fall independently of each other and independently of the conveyor frame. When the caster wheel 6 of the main frame passes over an elevation or depression in the ground the main frame members may tilt with the trunnions 9 acting as pivots, but inasmuch as the conveyor frame members 22 as well as the receptacle frame members 16 are pivotally connected with the main frame members, this tilting movement is permitted without strain upon the structure parts, the upper ends of the conveyor frame members 22 sliding upon the supporting shelves 33 to compensate for such tilting movement. The same is true when the rear caster wheels 20 ride over elevations or depressions, thus raising or lowering the rear end of that frame. The arrangement also permits of the ready assembly of the receptacle and conveyor frame members or permits the parts to be readily taken apart when desired.

Having thus described my invention, I claim:

1. In a sweeper of the character described, a main frame, carrying wheels therefor, a rotary sweeper element carried by said main frame, an operating device for said sweeper element carried by said main frame and operatively connected with said carrying wheels, a receptacle frame pivotally connected at its forward end with said main frame, a receptacle carried by said receptacle frame, a conveyor frame pivotally connected with said main frame at its forward end and having its rear end supported by said receptacle frame, and a conveyor carried by said conveyor frame.

2. In a sweeper of the character described, a main frame, side carrying wheels for said frame, a rotary sweeper element carried by said main frame, a receptacle frame pivotally connected with said main frame, a receptacle supported by said receptacle frame, a wheeled support for the rear end of said receptacle frame, a conveyor frame, a shaft carried by said main frame upon which the forward end of said conveyor frame is pivotally mounted, a roll connected with said shaft, means for driving said shaft from one of said side carrying wheels, an endless apron carried by said conveyor frame and driven from said roll, and means for supporting the rear end of said conveyor frame from said receptacle frame.

3. In a sweeper of the character described, a main frame, carrying wheels therefor, a rotary sweeper element carried by said main frame, an operating device for said sweeper element carried by said main frame and operatively connected with said carrying wheels, a receptacle frame pivotally connected at its forward end with said main frame, a receptacle carried by said receptacle frame, a conveyor comprising upper and lower rolls and an endless apron passing about said rolls, said upper roll being supported from said receptacle frame, said lower roll being rotatably mounted on said main frame and means for driving said lower roll.

In testimony whereof, I have hereunto set my hand this 16th day of February, 1923.

EDWIN D. PARKER.